United States Patent
Sugimoto

(10) Patent No.: US 8,640,117 B2
(45) Date of Patent: Jan. 28, 2014

(54) SOFTWARE UPDATE VERIFICATION APPARATUS, METHOD AND PROGRAM

(75) Inventor: Yuichiro Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 999 days.

(21) Appl. No.: 12/245,245

(22) Filed: Oct. 3, 2008

(65) Prior Publication Data

US 2009/0094591 A1 Apr. 9, 2009

(30) Foreign Application Priority Data

Oct. 4, 2007 (JP) ................................ 2007-260869

(51) Int. Cl.
*G06F 9/44* (2006.01)

(52) U.S. Cl.
USPC ............. 717/168; 717/169; 717/170; 717/171

(58) Field of Classification Search
None
See application file for complete search history.

(56) References Cited

U.S. PATENT DOCUMENTS

| | | | | |
|---|---|---|---|---|
| 7,546,594 B2 * | 6/2009 | McGuire et al. | ............... | 717/168 |
| 7,698,698 B2 * | 4/2010 | Skan | ............... | 717/168 |
| 7,752,616 B2 * | 7/2010 | Marolia et al. | ............... | 717/169 |
| 8,146,073 B2 * | 3/2012 | Sinha | ............... | 717/170 |
| 8,448,162 B2 * | 5/2013 | Ramanathan et al. | ........ | 717/171 |
| 2004/0181787 A1 * | 9/2004 | Wickham et al. | ............... | 717/168 |
| 2005/0132359 A1 * | 6/2005 | McGuire et al. | ............... | 717/175 |
| 2006/0010435 A1 * | 1/2006 | Jhanwar et al. | ............... | 717/168 |
| 2006/0075284 A1 * | 4/2006 | Skan | ............... | 714/5 |
| 2006/0174223 A1 * | 8/2006 | Muir et al. | ............... | 717/106 |
| 2007/0150857 A1 * | 6/2007 | Korkishko et al. | ............ | 717/106 |
| 2007/0169079 A1 * | 7/2007 | Keller et al. | ............... | 717/168 |
| 2007/0220226 A1 * | 9/2007 | Kirihata | ............... | 711/163 |
| 2009/0064123 A1 * | 3/2009 | Ramesh et al. | ............... | 717/168 |
| 2010/0107150 A1 * | 4/2010 | Kamada et al. | ............... | 717/170 |

FOREIGN PATENT DOCUMENTS

JP 2006-113754 A 4/2006

OTHER PUBLICATIONS

Michael Hicks et al., Dynamic Software Updating, 2001 ACM, pp. 13-23, <http://dl.acm.org/citation.cfm?id=378798>.*
Anthony Bellissimo, Secure Software Updates: Disappointments and New Challenges, 2006 USENIX, pp. 37-43, <https://www.usenix.org/legacy/event/hotsec06/tech/full_papers/bellissimo/bellissimo.pdf>.*
Chih-Chieh Han et al., Sensor network software update management a survey, 2005 International Journal of Network management, pp. 283-294, <http://onlinelibrary.wiley.com/doi/10.1002/nem.574/pdf>.*

(Continued)

*Primary Examiner* — Thuy Dao
*Assistant Examiner* — Cuong V Luu
(74) *Attorney, Agent, or Firm* — Westerman, Hattori, Daniels & Adrian, LLP

(57) ABSTRACT

A software update verification apparatus which has an operating system (OS) that has a normal mode and a software update mode for calling a verification unit when being activated by a software update interface unit, a generating unit that operates on the OS in the normal mode and performs generating processing including call processing for calling a software update interface unit by a plurality of processes, a software update interface unit that activates the OS in the software update mode when being called by the generating unit, and a verification unit that performs verification processing for verifying the generating processing performed by the plurality of processes when being called by the OS in the software update mode.

16 Claims, 14 Drawing Sheets

(56) References Cited

OTHER PUBLICATIONS

Gerard Holzmann et al., An automated verificaiton method for distributed systems software based on model extraction, 2002 IEEE, pp. 364-377, <http://ieeexplore.ieee.org/stamp/stamp.jsp?tp=&arnumber=995426>.*

Robert N. Britcher et al., Using modern design practices to upgrade aging software systems, 1986 IEEE, pp. 16-24, <http://ieeexplore.ieee.org/stamp/stamp.jsp?tp=&arnumber=1695537>.*

Eiichi Horiuchi et al., Safety Issues in Nonstop Update of Running Programs for Mobile Robots, 2005 IEEE, 7 pages, <http://ieeexplore.ieee.org/stamp/stamp.jsp?tp=&arnumber=1545329>.*

* cited by examiner

SOFTWARE UPDATE VERIFICATION APPARATUS, METHOD AND PROGRAM

CROSS-REFERENCE TO RELATED APPLICATIONS

This application is based upon and claims the benefit of priority of the prior Japanese Application No. 2007-260869, filed on Oct. 4, 2007, the entire contents of which are incorporated herein by reference.

BACKGROUND

1. Field

The present invention relates to a software update verification apparatus, method and program, and, more specifically, to the software update verification apparatus, method and program in which software update on a universal OS (Operating System) is performed upon verification of validity of the update.

2. Description of the Related Art

A universal OS (Operating System) is loaded into commercial computers. The universal OS includes an interface (software update interface) which performs such update processing to update software (ex. program) operating on the OS. This interface is activated in a specific software update mode.

A software update verification apparatus is proposed in Japanese Laid-Open Patent Publication 2006-113754 in which the software update verification apparatus promptly confirms operations of updating to a new OS and confirming the validity of the update in a plurality of nodes.

Being universal, the universal OS has to be capable of being used by all users. Therefore, it is impossible to inhibit calling itself of a software update interface which is part of the universal OS. As a result, any person with malicious intention can call the software update interface and illegally update the software on the universal OS.

Such illegal software update can be prevented in the following way. For example, a password file is made before calling the software update interface. Then the password is referred after the computer is restarted in the software update mode by the software update interface. If the password is invalid, the rest of the software update processing is not performed.

In this method, however, according to an inspection by the inventor of the present invention, it is possible to obtain the password file by using a method, such as for cutting power of the computer at timing before restarting the computer after changing into the software update mode. If the computer is restarted in the software update mode by using the password file obtained illegally, the computer cannot verify if the password is invalid even though the password is referred. Therefore, it is impossible to prevent malicious software update processing from that time on.

SUMMARY

Accordingly, it is an object of the invention to provide a software update verification apparatus which verifies validity of the software update processing on the universal OS in order to prevent illegal use of the software update.

Accordingly, it is an object of the invention to provide a software update verification method for verifying validity of the software update processing on the universal OS in order to prevent illegal use of the software update.

An other object of the present invention is to provide a software update verification program for verifying validity of the software update processing on the universal OS in order to prevent illegal use of the software update.

According to an aspect of the invention, an apparatus includes an OS that has a normal mode and a software update mode for calling a verification unit when being activated by a software update interface unit, a generating unit that operates on the OS in the normal mode and performs generating processing including call processing for calling a software update interface unit by a plurality of processes, a software update interface unit that activates the OS in the software update mode when being called by the generating unit, and a verification unit that performs verification processing for verifying the generating processing performed by the plurality of processes when being called by the OS in the software update mode.

Additional objects and advantages of the invention will be set forth in part in the description which follows, and in part will be obvious from the description, or may be learned by practice of the invention.

The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE EMBODIMENTS

Figure 1:
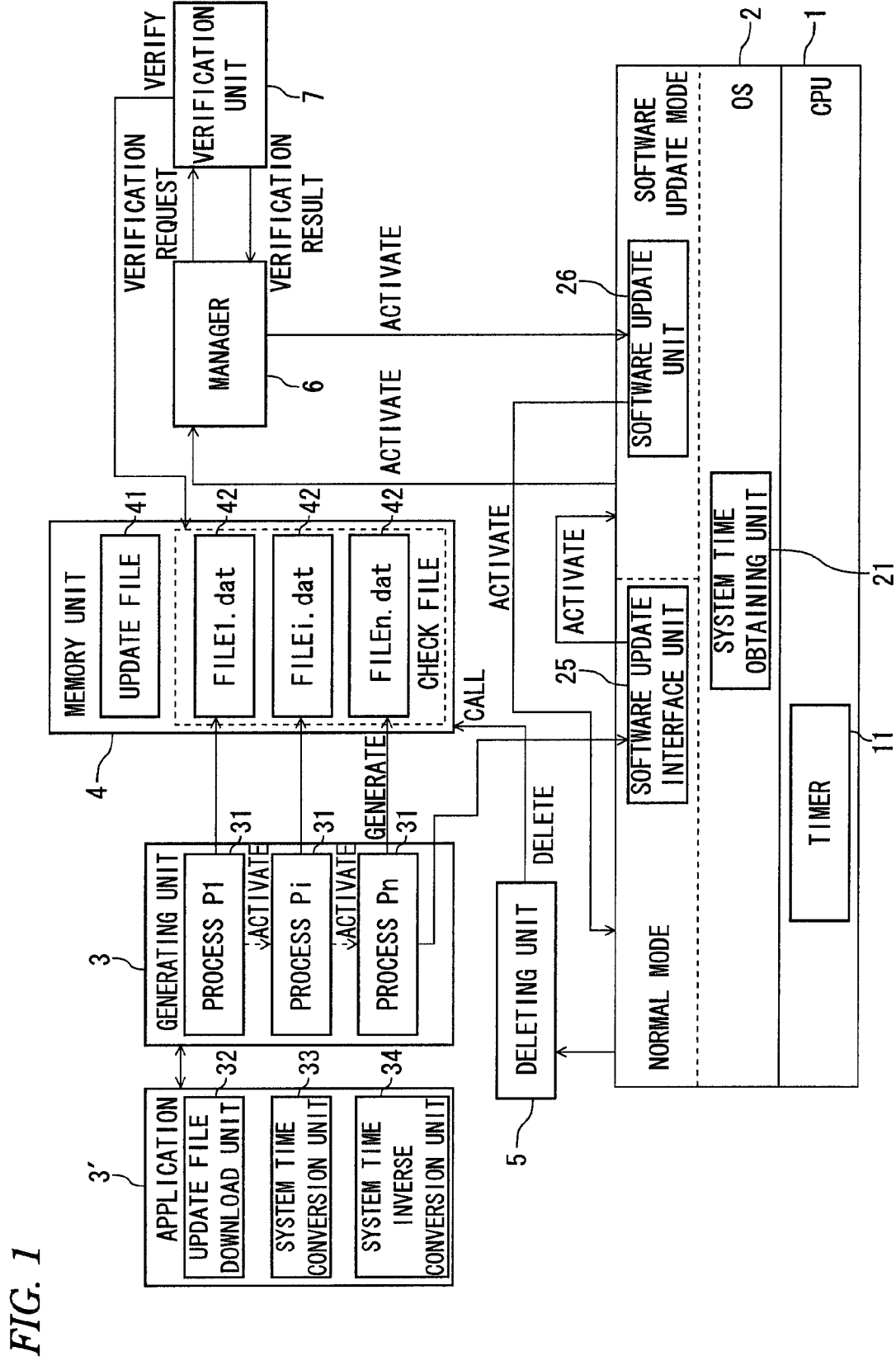
FIG. 1 is a configuration diagram showing a software update verification apparatus of the present invention.
Figure 2:
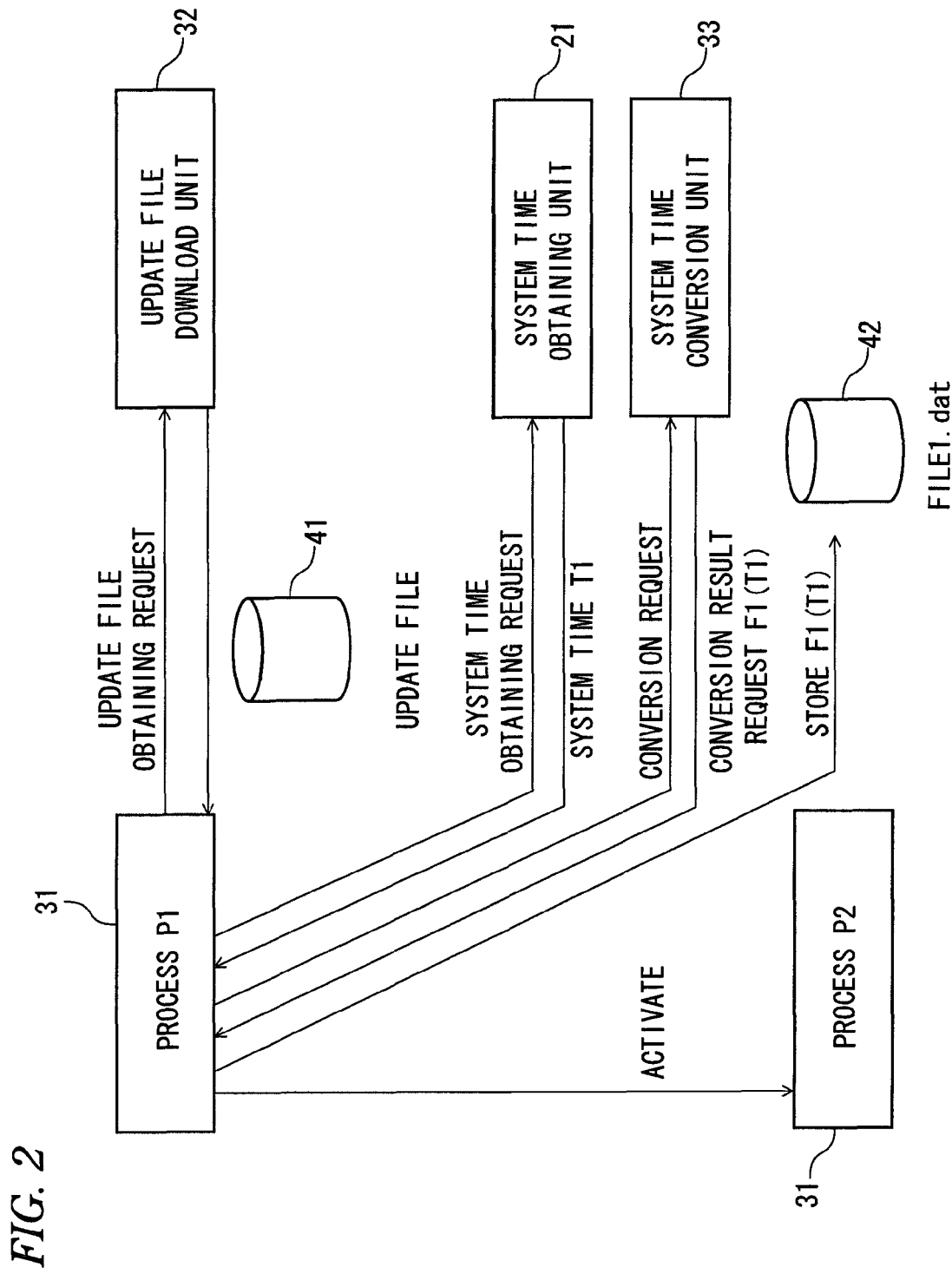
FIG. 2 is an illustration diagram of software update verification processing of the present invention.
Figure 3:
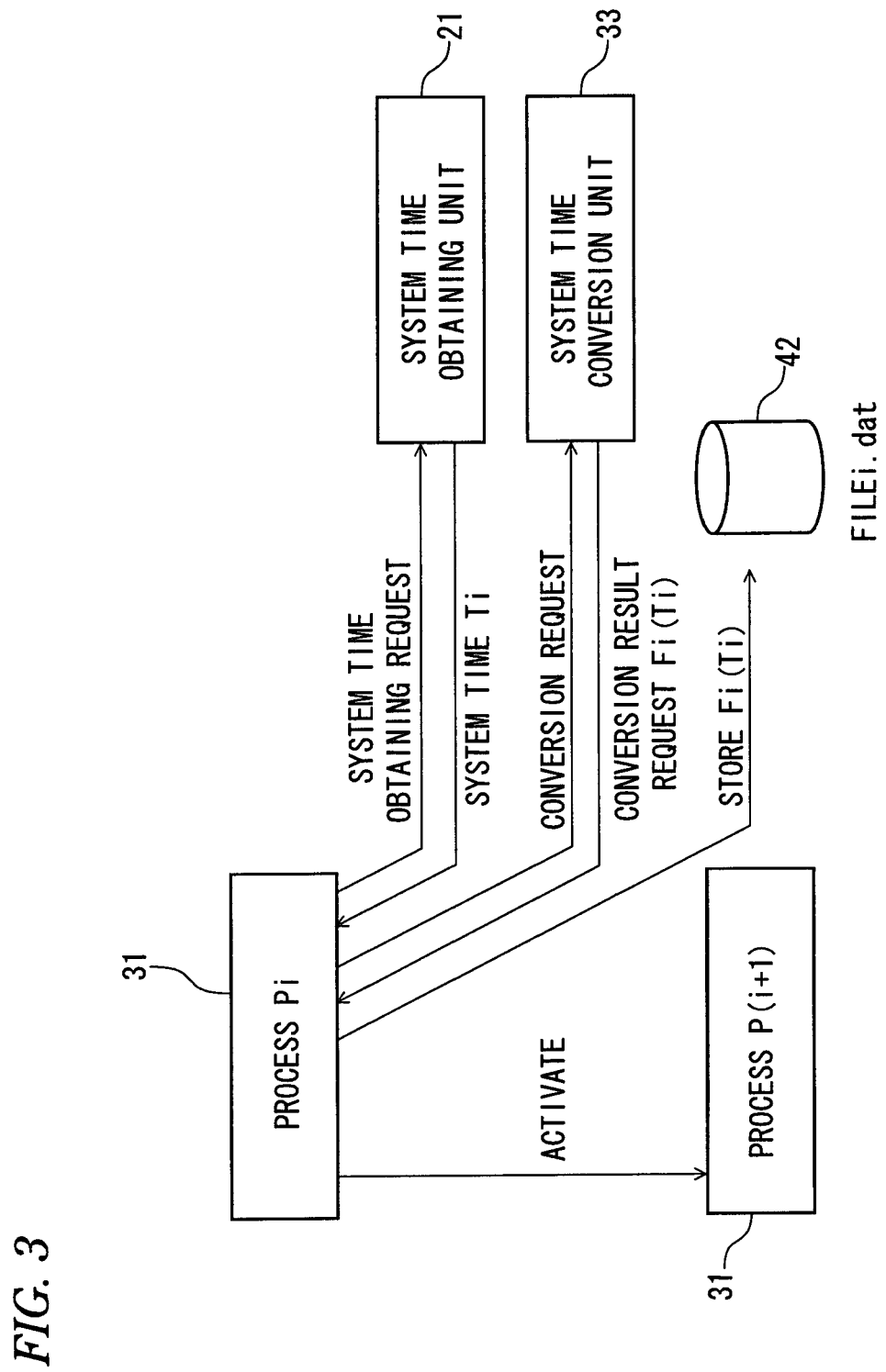
FIG. 3 is an illustration diagram of the software update verification processing of the present invention.
Figure 4:
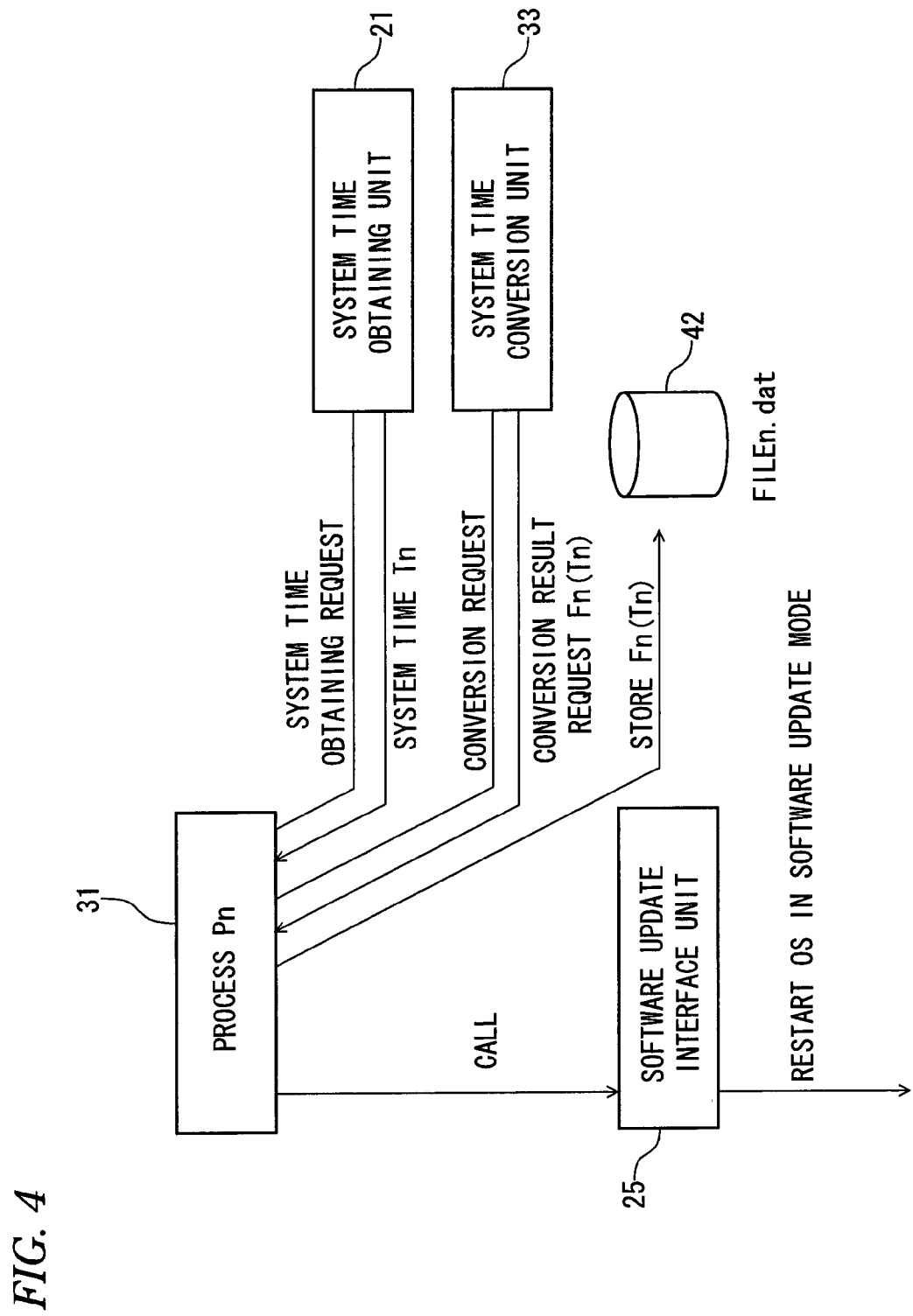
FIG. 4 is an illustration diagram of the software update verification processing of the present invention.

FIG. 1 is a configuration diagram showing a software update verification apparatus of the present invention. FIG. 2 to FIG. 4 are illustration diagrams of software update verification processing of the present invention.

An OS 2 operates on a CPU 1 and has a normal mode and a software update mode as an operation mode. Either the normal mode or the software update mode is selected alternatively. The normal mode includes a software update interface unit 25, and the software update mode includes a software update unit 26. When being activated by the software update interface unit 25, the software update mode calls a verification unit 7. As described later, the verification unit 7 is actually called through a manager 6.

A generating unit 3 and a deleting unit 5 operate on the normal mode of the OS 2. The manager 6 and the verification unit 7 operate on the software update mode of the OS 2. A memory unit 4 is used (written or referred) by the OS 2 both in the normal mode and the software update mode. Meanwhile, the OS 2 includes a system time obtaining unit 21 as an API (Application Programming Interface).

The generating unit 3 is called by a user (user application program) who attempts to perform software update on the OS 2 in the normal mode. In this call, a name of the software (program) to be updated is specified. The generating unit 3 restarts the OS 2 in the software update mode through the software update interface unit 25. The restarted OS 2 obtains a verification result from the verification unit 7 through the manager 6 and restarts the software update unit 26. After updating the software, the software update unit 26 restarts the OS 2 in the normal mode.

An application (program) 3' is provided as a generating additional unit, so that the generating unit 3 can perform generating processing. As described later, the application 3' is called by a plurality of processes 31 included in the generating unit 3 and is requested to perform the processing. The application 3' is provided with an update file download unit 32, a system time conversion unit 33, and a system time inverse conversion unit 34. A conversion/inverse conversion in the system time conversion unit 33 and the system time inverse conversion unit 34 is, for example, an identity conversion.

The generating unit 3 performs the generating processing in update processing of a particular program. The generating processing is updated preparatory processing for calling an interface to perform the software update. The generating unit 3 includes the plurality of processes 31 (P1 to Pn). The generating processing is performed by the plurality of processes 31. That is, the generating processing in the update processing of the software, i.e., the program, is divided into the plurality of processes 31 to be performed. Each of the divided generating processing includes, for example, obtaining an update file 41, generating a check file 42, calling the software update interface unit 25 and the like. The divided generating processing which each of the processes 31 should perform is specified (allocated) in advance. Each of the processes 31 performs one or a plurality of the divided generating processing which is allocated to itself in advance.

As shown in FIG. 2, a process P1 performs obtaining the update file 41 and generating the check file 42. The process P1 can perform only one of the processing. For example, the process P1 can perform only obtaining the update file 41.

If the generating unit 3 is performed, the process 1 requests an update file download unit 32 of the application 3' to obtain the update file 41 and receives the update file 41 which is downloaded from the update file download unit 32 as a response. The request includes a name of the program which should be updated. The update file 41 includes a revised program having the name of the program, that is, the program which should be updated. Accordingly, the process P1 obtains the update file 41 as the generating processing. The update file 41 is stored in a memory unit 4 and is used by a software update unit 26 as described later.

Next, the process P1 requests the system time obtaining unit 21 which is the API of the OS 2 and receives a system time T1 from the system time obtaining unit 21 as a response. The system time is obtained from a timer 11 of the CPU 1. The process P1 requests the system time conversion unit 33 of the application 3' and receives a conversion result F1 (T1) from the system time conversion unit 33 as a response. The process P1 generates and stores the check file 42 (FILE1.dat) for storing the conversion result F1 (T1). The check file 42 is stored in the memory unit 4 and is used (verified) by the verification unit 7 as described later.

In this case, the system time conversion unit 33 includes a conversion algorithm F1 (not shown in the figures) for converting the system time into a byte sequence in a one-to-one conversion. This conversion can prevent illegal (malicious) software update more effectively than by storing the system time directly into the check file 42. Different conversion algorithms can be used depending on each of the processes 31. In this case, the illegal software update can be practically impossible.

The data (time data) stored in a check file FILE1.dat includes the data based on the time at the generation of the check file 42. The conversion processing of the system time can be omitted (the same is true of other process 31). Therefore, the time data can be the time (T1) at the generation of the check file 42.

By storing the time data in the check file 42, the time data can be provided with an expiration date. Specifically, as described later, by the expiration data in combination with a threshold value, the check file can be invalid in the case of illegal use such as shutting off the power of the computer. Moreover, since a plurality of check files 42 are generated, analyses of the check files 42 are complicated. Thus, the illegal software update can be practically impossible.

After the above described processing, the process P1 activates a process P2 (next process) which should be activated. It is specified which process 31 to be activated in advance.

A process Pi (i=2 to (n−1)) which is a middle process of the generating unit 3 performs the generation of the check file 42 as the generating processing as shown in FIG. 3. That is, like the process P1, the process Pi receives a system time Ti from the system time obtaining unit 21, receives a conversion result Fi (Ti) from the system time conversion unit 33, and generates and stores the check file 42 (FILEi.dat) for storing the conversion result Fi (Ti). After that, the process Pi activates a next process P(i+1).

The process Pi can perform the processing which is peculiar to the process (inherent processing) other than generating the check file 42. Further, the process Pi can be omitted, so that only the process P1 and the process Pn can be performed. In this case, the generating processing is divided into two, i.e., the process P1 and the process Pn. This is an example of the minimum division.

As shown in FIG. 4, as the generating processing, the final process Pn of the generating unit 3 performs the generation of the check file 42 and the call of the software update interface unit 25. That is, like the process P1, the process Pn receives a system time Tn from the system time obtaining unit 21, receives a conversion result Fn (Tn) from the system time conversion unit 33, and generates the check file 42 for storing the conversion result Fn (Tn).

In this case, a time interval from the system time T1 to Tn can be known in advance by actual measurement. For example, the time interval is approximately 30 seconds. Further, the same is true of the time interval from the system time T1 to Tn. For example, the time interval is approximately one second to several seconds. The time interval from the system time T1 to Tn usually varies depending on the time needed for the inherent processing of each process.

Then the process Pn calls the software update interface unit 25 of the OS 2 instead of activating the next process. Conventionally, if the power of the computer is shut off at the time when one password file corresponding to the plurality of check files 42 is generated, it is impossible to exclude the illegal update. According to the present invention, however, it is difficult to obtain correctly all of the plurality of check files 42. Thus, it is practically possible to exclude the illegal software update.

As described above, the generating processing is divided into the plurality of processes 31 to be performed by the generating unit 3 which operates on the OS 2 in the normal mode. Thus, the plurality of check files 42 are generated by the plurality of processes 31. The generation of the plurality of check files 42 can be omitted, so that the plurality of processes 31 can be called in sequence. A file whose content is "empty" can be generated as the plurality of check files 42. That is, the generating processing in the update processing of the program is performed by the plurality of processes 31 and includes at least call processing for calling the software update interface unit 25.

The software update interface unit 25 operates on the OS 2 in the normal mode at the time of being called. As shown in FIG. 4, however, when being called from the process Pn which is the generating unit 3, the software update interface unit 25 once shuts down the OS 2 in the normal mode and immediately restarts the OS 2 in the software update mode.

Figure 5:
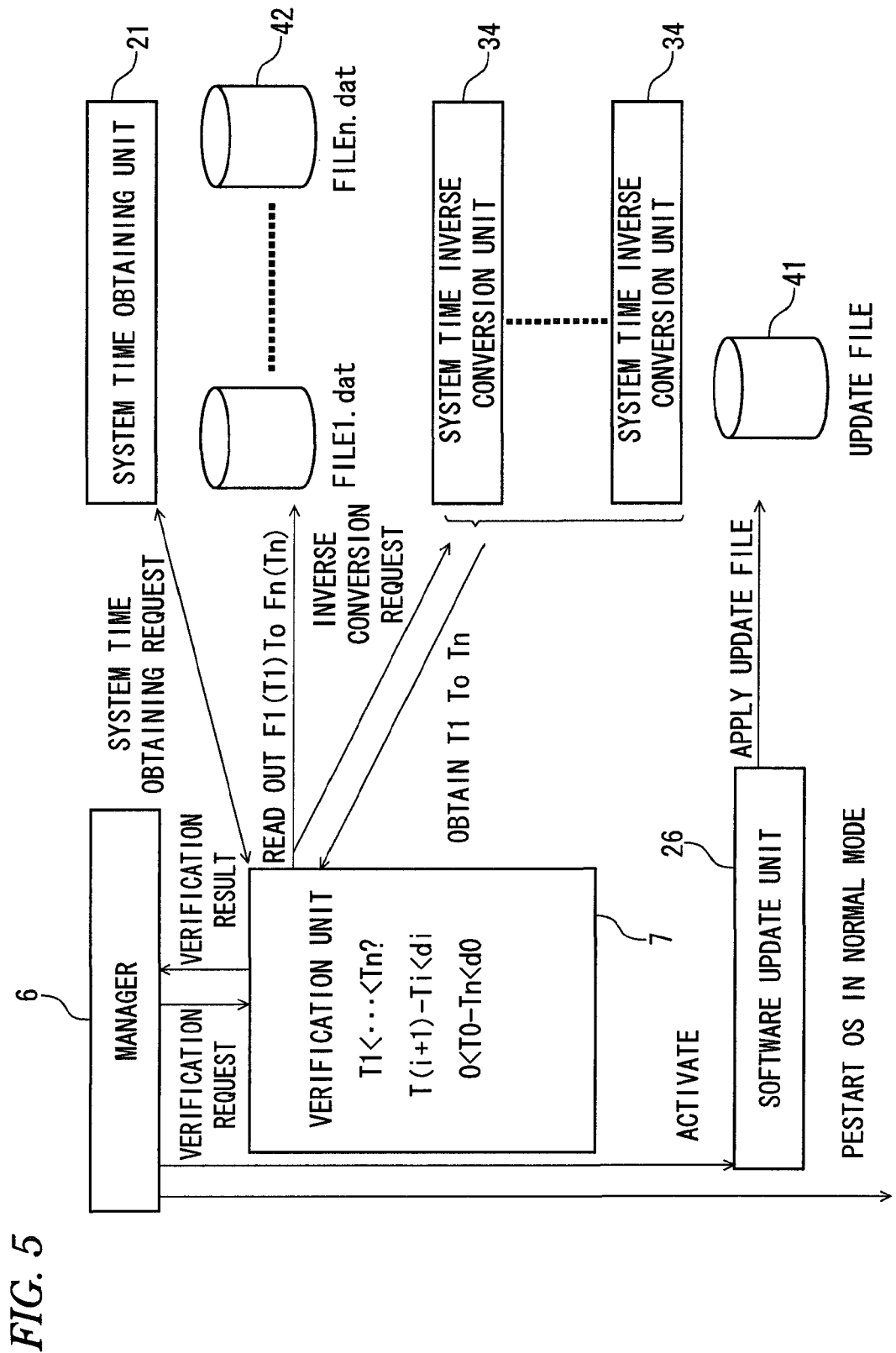
FIG. 5 is an illustration diagram of the software update verification processing of the present invention.

After the OS 2 is restarted in the software update mode, the manager 6 is activated immediately. As shown in FIG. 5, the activated manager 6 calls the verification unit 7 to request to verify the generating processing in the update processing of the program.

When being called by the manager 6 (i.e., the OS 2 in the software update mode), the called verification unit 7 performs verification processing for verifying the generating processing performed by the plurality of processes 31. The verification processing includes, for example, the verification of the plurality of check files 42 generated by the plurality of processes 31.

As shown in FIG. 5, specifically, the verification unit 7 receives a system time T0 from the system time obtaining unit 21. The system time T0 corresponds to the present time. Moreover, the verification unit 7 reads out the conversion results F1 (T1) to Fn (Tn) from the check files FILE1.dat to FILEn.dat of the number of n, requests the system time inverse conversion unit 34 of the application 3' to inverse-convert the conversion results F1 (T1) to Fn (Tn) and the system time, and receives the system times T1 to Tn from the system time inverse conversion unit 34 as a response.

At this time, the system time inverse conversion unit 34 includes the inverse conversion algorithms inv-F1 to Fn (not shown in the figures) for inverse-converting the system time, inverse-converted into the byte sequence by the conversion algorithms F1 to Fn, into an original system time in the one-to-one conversion. The original system times T1 to Tn can be obtained by this inverse conversion.

By using the system times T1 to Tn, the verification unit 7 performs part or entire of a first to fourth verification processing as follows. One or more than one of the verification processing (and the combination) to be performed is specified in advance in view of processing time and processing level.

The verification unit 7 verifies whether or not the plurality of check files FILE1.dat to FILEn.data exist, and whether or not the system times (time data) T1 to Tn can be obtained from each of the plurality of check files FILE1.dat to FILEn-.dat (first verification processing). The number of the check file 42 is specified depending on the number of the process 31. Based on this, it is possible to check the number (i.e., the existence) of the check file 42. As described later, the system time has only to confirm that the time in a correct format is obtained from each of the check files 42. In this case, the verification unit 7 validates the verification result when the plurality of check files 42 exist and the system time can be obtained from each of the plurality of check files 42.

The verification unit 7 can verify only whether or not the plurality of check files FILE1.dat to FILEn.dat exist.

Further, the verification unit 7 verifies whether or not the system times T1 to Tn stored in each of the plurality of check files FILE1.dat to FILEn.dat include one time-series (second verification processing). As described above, since the processes P1 to Pn generate the check files FILE1.dat to FILEn.dat in this order, the system times Ti to Tn include the time-series, $T1< \ldots <Ti< \ldots <Tn$, (the T1 is the earliest time and the Tn is the latest time) without fail. The verification unit 7 validates the verification result if the system times T1 to Tn include the time-series.

Furthermore, the verification unit 7 verifies whether or not a difference between each of the system times T1 to Tn stored in the plurality of check files FILE1.dat to FILEn.dat and other closest system time is smaller than a first threshold value di (third verification processing). For example, it is possible to verify whether or not the difference is smaller than the threshold value di by calculation of $T(i+1)-Ti$. The same is true of all of the system times. The difference $T(i+1)-Ti$ corresponds to the time period from when a certain check file FILEi.dat is generated until a next check file FILE(i+1).dat is generated.

The first threshold value di is a value which is obtained based on actual measurement of the time needed to generate each of the plurality of check files FILE1.dat to FILEn.dat. As described above, the time interval of each system times is approximately one second to several seconds. Thus, the first threshold value di is deemed to be larger than the value, for example, ten seconds. The verification unit 7 validates the verification result if the difference is smaller than the first threshold value di.

Moreover, the verification unit 7 verifies whether or not the difference T0-Tn between the present time T0 and the data having the largest value (the Tn in this case) of the system times stored in each of the plurality of check files FILE1.dat to FILEn.dat is smaller than a second threshold value d0 (fourth verification processing). The difference T0-Tn corresponds to the time period from when the final check file FILEn.dat is generated until the present time.

The second threshold value d0 is a value which is obtained based on the actual measurement of the time period needed from the end of the generation of the plurality of check files FILE1.dat to the verification by the verification unit 7. As described above, the time interval from the system time T1 to the system time Tn is, for example, approximately thirty seconds. Thus, the second threshold value d0 is deemed to be larger than the value, for example, forty seconds. The verification unit 7 validates the verification result if the difference is smaller than the second threshold value d0.

As shown in FIG. 5, the manager 6 of the OS 2 in the software update mode is given the verification result by the verification unit 7 in response to the verification request described above. The manager 6 of the OS 2 in the software update mode activates a software update unit 26 if the verification result obtained from the verification unit 7 is valid. Meanwhile, the OS 2 in the software update mode restarts the OS 2 in the normal mode without activating the software update unit 26 if the verification result obtained from the verification unit 7 is invalid.

Therefore, when the verification result is invalid based on some illegal action, the illegal software update can be prevented because the rest of the operation of the OS 2 in the software update mode can be discontinued. Further, even though the software update unit 26 is activated without performing the plurality of processes 31, the rest of the operation of the OS 2 in the software update mode can be discontinued because the verification result is invalid.

When being activated by the OS 2 in the software mode, the software update unit 26 updates the program by using an update file 41 as shown in FIG. 5. For example, the program is updated by applying (overwriting) a new program stored in the update file 41 to the program. After that, the software update unit 26 restarts the OS 2 in the normal mode.

Figure 6:
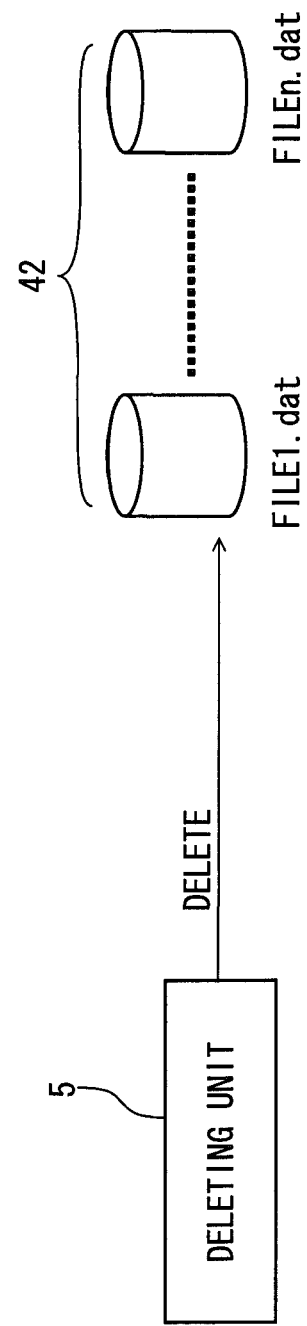
FIG. 6 is an illustration diagram of the software update verification processing of the present invention.

When being activated in the normal mode, the OS 2 deletes the plurality of check files 42 as shown in FIG. 6. Therefore, when being activated in the normal mode, the OS 2 calls a deleting unit 5. Accordingly, when being activated in the normal mode after the update of the program by the software update unit 26, the OS 2 deletes the plurality of check files FILE1.dat to FILEn.dat generated by the plurality of processes P1 to Pn. This makes it possible to prevent illegal use of the check file 42.

FIG. 7 to FIG. 14 are flowcharts illustrating software update verification processing of the present invention.

Figure 7:
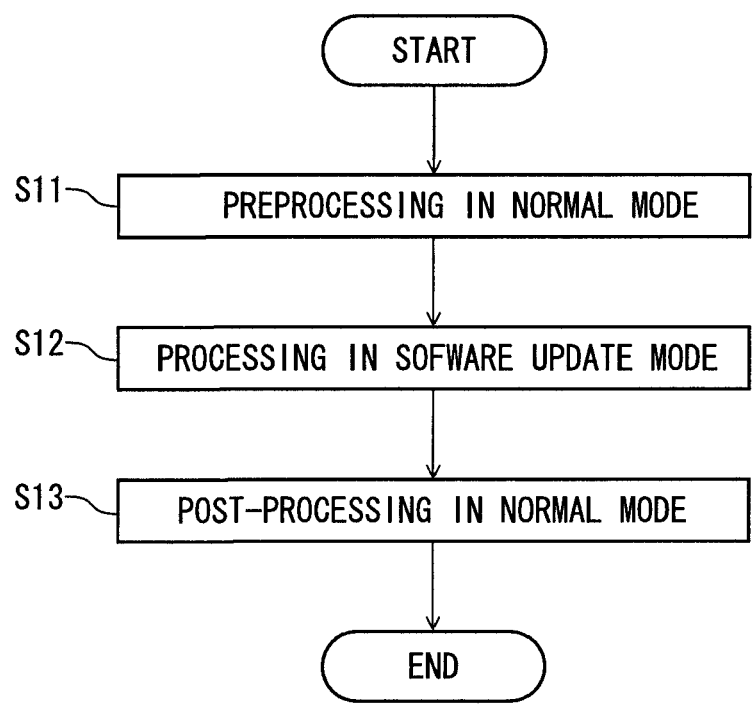
FIG. 7 is a flowchart of the software update verification processing of the present invention.

FIG. 7 is an entire processing flow of the software update verification processing of the present invention. In FIG. 7, preprocessing (generating processing) is performed in the normal mode of the OS 2 (step S11), the verification processing and the software update processing are performed in the software update mode of the OS 2 (step S12), and post-processing (deleting processing) is performed in the normal mode of the OS 2 (step S13).

Figure 8:
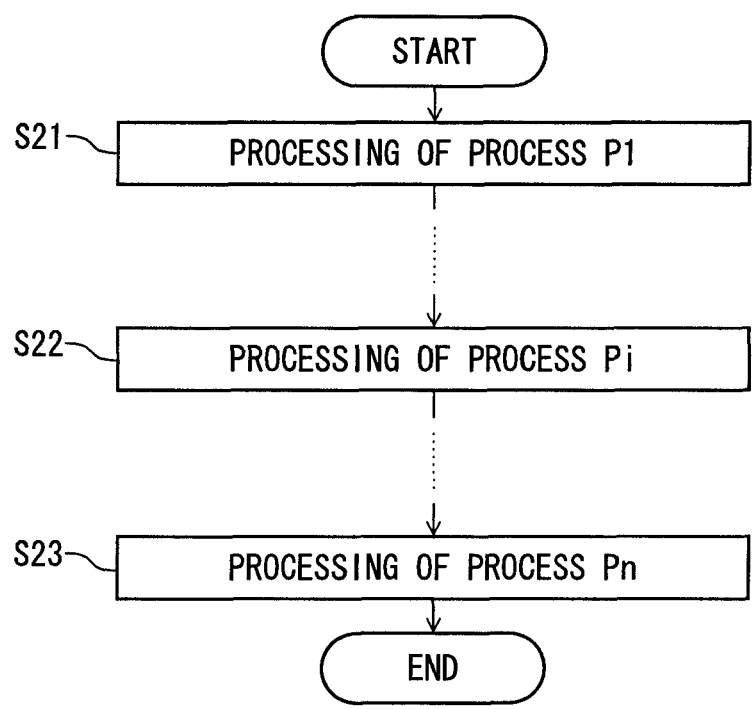
FIG. 8 is a flowchart of the software update verification processing of the present invention.

FIG. 8 shows a processing flow of the generating processing performed in step S11 of FIG. 7. In FIG. 8, the first process P1 performs the inherent processing (step S21), the middle process Pi performs the inherent processing (step S22), and the process Pn performs the inherent processing (step S23).

Figure 9:
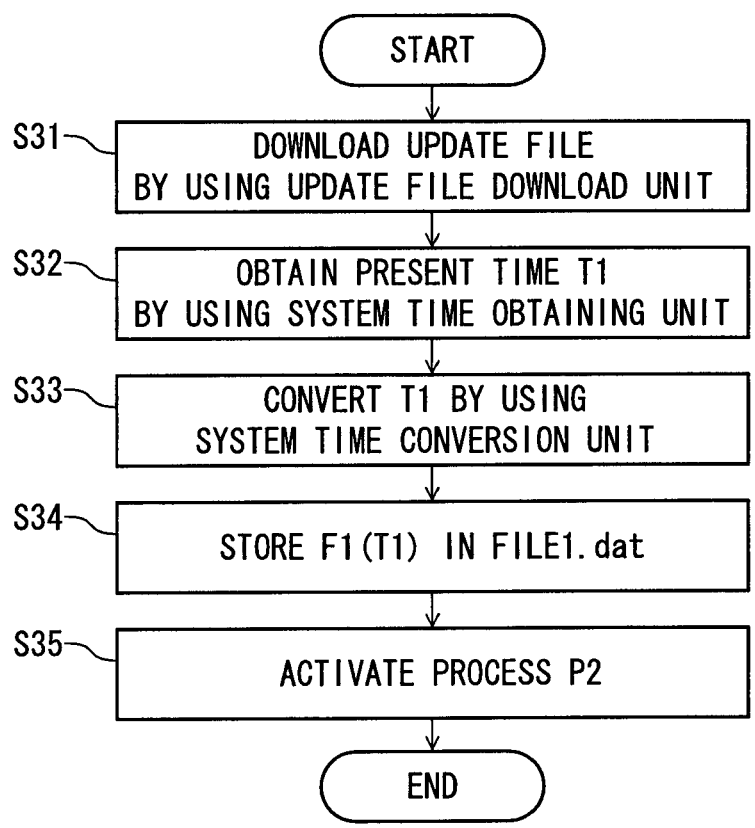
FIG. 9 is a flowchart of the software update verification processing of the present invention.

FIG. 9 shows a processing flow performed by the process P1 in step S21 of FIG. 8. In FIG. 9, the first process P1 downloads the update file 41 by using an update file download unit 32 (step S31), obtains the present time as the system time T1 at that point by using the system time obtaining unit 21 (step S32), converts the system time T1 by using the system time conversion unit 33 including the conversion algorithm F1 (step S33), and stores the conversion result F1 (T1) in the check file 42 FILEn.dat (step S34) After that, the process P1 activates the next process P2 (step S35).

Figure 10:
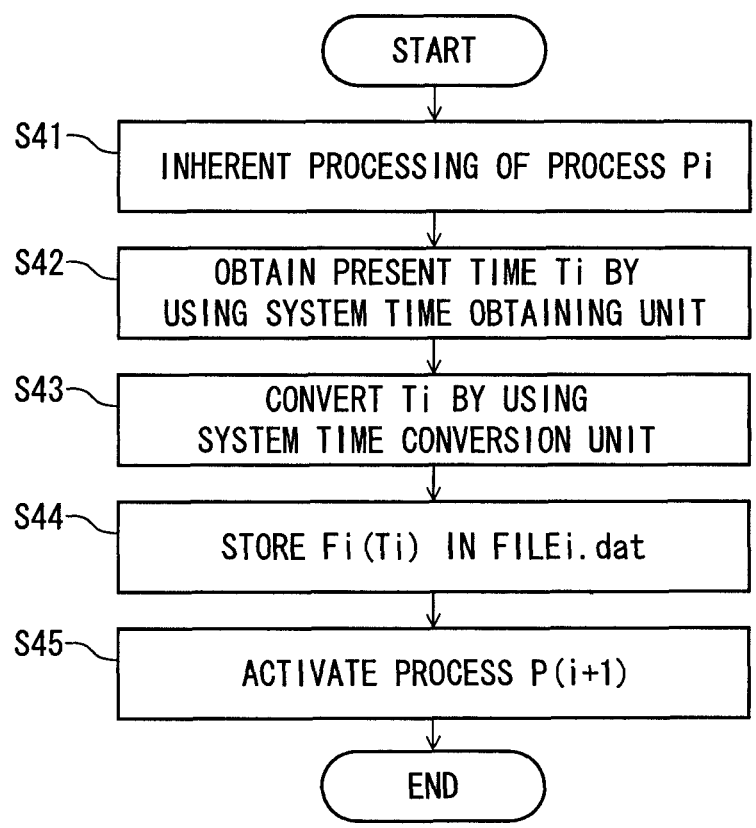
FIG. 10 is a flowchart of the software update verification processing of the present invention.

FIG. 10 shows a processing flow performed by the process P1 in step S22 of FIG. 8. In FIG. 10, the middle process P1 performs the inherent processing (step S41), then obtains the present time as the system time T1 at that point by using the system time obtaining unit 21 (step S42), converts the system time T1 by using the system time conversion unit 33 including the conversion algorithm Fi (step S43), and stores the conversion result Fi (Ti) in the check file 42 FILEi.dat (step S44). After that, the process P1 activates the next process P(i+1) (step S45).

Figure 11:
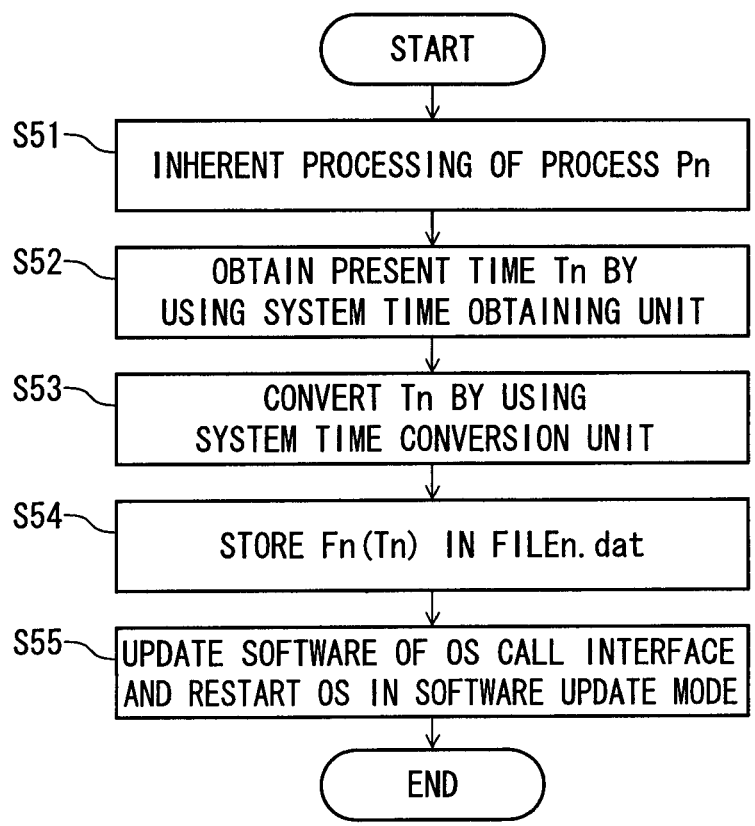
FIG. 11 is a flowchart of the software update verification processing of the present invention.

FIG. 11 shows a processing flow performed by the process Pn in step S23 of FIG. 8. In FIG. 11, the final process Pn performs the inherent processing (step S51), then obtains the present time as the system time Tn at that point by using the system time obtaining unit 21 (step S52), converts the system time Tn by using the system time conversion unit 33 (step S53), and stores the conversion result Fn (Tn) in the check file 42 FILEn.dat (step S54). After that, the process Pn calls the software update interface unit 25 and restarts the OS 2 in the software update mode without activating the next process (step S55).

Figure 12:
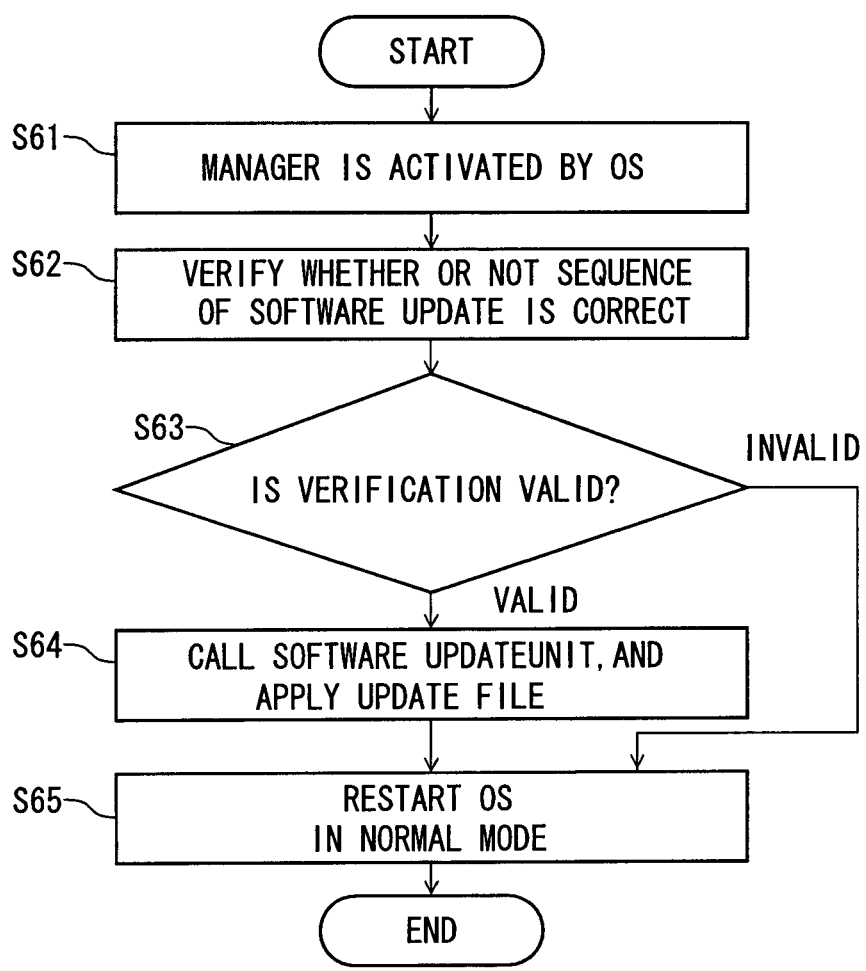
FIG. 12 is a flowchart of the software update verification processing of the present invention.

FIG. 12 shows a processing flow of the verification processing and the update processing performed in step S12 of FIG. 7. In FIG. 12, when the OS 2 restarted in the software update mode activates the manager 6 (step S61), the manager 6 verifies whether or not a sequence of the software update is correct by using the verification unit 7 (step S62) and checks whether or not the verification result obtained from the verification unit 7 is valid (step S63). If the verification result is valid, the manager 6 calls the software update unit 26, applies the update file 41 to the program (step S64), and restarts the OS 2 in the normal mode (step S65). If the verification result is not valid (if the verification result is invalid), the manager 6 omits step S64 and performs step S65.

Figure 13:
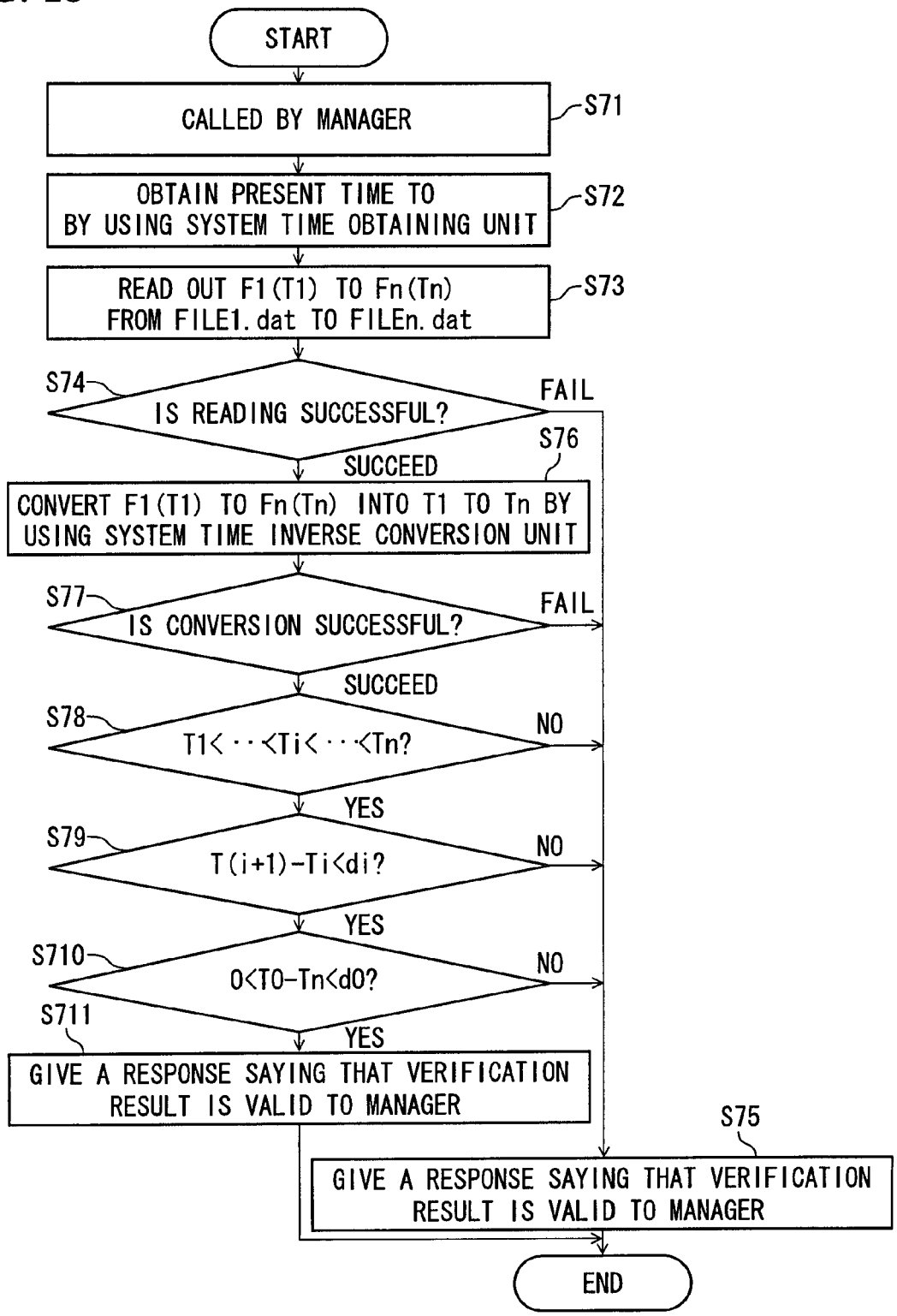
FIG. 13 is a flowchart of the software update verification processing of the present invention.

FIG. 13 shows a processing flow of the verification processing performed in step S62 of FIG. 12. In FIG. 13, when being called by the manager 6 (step S71), the verification unit 7 obtains the present time as the system time T0 at that point by using the system time obtaining unit 21 (step S72), reads out the conversion results F1 (T1) to Fn (Tn) from the plurality of check files 42 FILE1.dat to FILEn.dat (step S73), and checks whether or not the reading is successful (step S74).

If the reading fails, the verification unit 7 gives the manager 6 a response saying that the verification result is invalid (step S75). If the reading is successful, the verification unit 7 uses the system time inverse conversion unit 34 including the inverse conversion algorithms inv-F1 to inv-Fn in order to inverse-convert the conversion results F1 (T1) to Fn (Tn) into the system times T1 to Tn (step S76) and checks whether or not the inverse conversion is successful (step S77).

If the inverse conversion fails, the verification unit 7 performs step S75. If the inverse conversion is successful, the verification unit 7 checks whether or not the system times T1 to Tn include the time-series $T1 < \ldots < Ti < \ldots < Tn$ (step S78). If the system time does not include the time-series, the verification unit 7 performs step S75.

If the system time includes the time-series, the verification unit 7 verifies whether or not the difference between each of the system times T1 to Tn and other closest system time (e.g., $Ti+1-Ti$) is smaller than the first threshold value di (step S79). If the difference is not smaller than the threshold value di, the verification unit 7 performs step S75.

If the difference is smaller than the threshold value di, the verification unit 7 checks whether or nor the difference $T0-Tn$ between the present time T0 and the largest value Tn of the system times is smaller than the second threshold value d0 (step S710). If the difference is not smaller than the threshold value d0, the verification unit 7 performs step S75. If the difference is smaller than the threshold value d0, the verification unit 7 gives the manager 6 a response saying that the verification result is valid (step S711).

Figure 14:
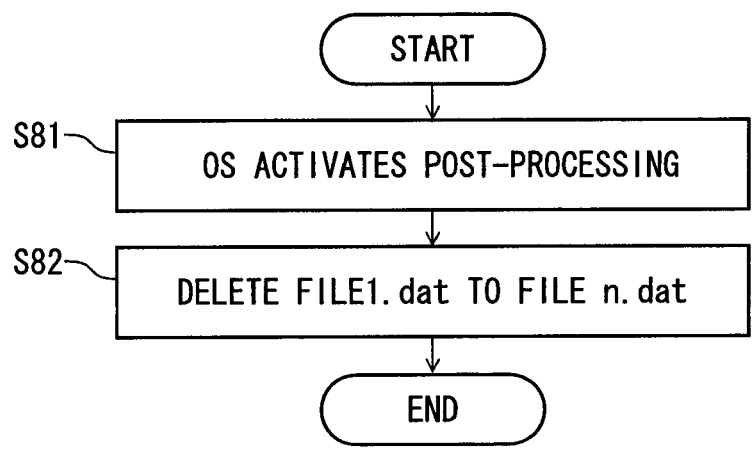
FIG. 14 is a flowchart of the software update verification processing of the present invention.

FIG. 14 shows a processing flow of the deleting processing performed in step S13 of FIG. 7. In FIG. 14, when the OS 2 restarted in the normal mode activates a post-processing unit (step S81), the post-processing unit deletes the plurality of check files 42 FILE1.dat to FILEn.dat (step S82).

According to the software update verification apparatus, method and program of the present invention, generating processing (preprocessing) including call processing for calling a software update interface unit is performed by a plurality of processes, the OS is activated in the software update mode by the software update interface unit, and the generating processing is verified by a verification unit called by the OS.

Therefore, for example, it is difficult to update the software even if the power of the computer is cut at the timing before restarting after changing into the software update mode and the computer is restarted in the software update mode. This is due to an extreme low probability of correctly obtaining all results of the generating processing (e.g., check files described later) which is performed by the plurality of processes. As a result, in the case of an illegal action, such as forging the result of the generating processing, the result showing the validity of the software update processing cannot be obtained even though the generating processing is verified. Therefore, malicious software update processing can be prevented. This makes it practically possible to prevent that any person with malicious intention calls the software update interface and updates the software illegally on the universal OS without inhibiting the calling itself of the software update interface.

According to an embodiment of the present invention, a plurality of check files is generated by the plurality of processes and is verified. As described above, the possibility of obtaining all the check files generated by the plurality of processes is extremely low. Therefore, malicious software update processing can be effectively prevented. Thus, it is practically possible to prevent that any person with malicious intention illegally updates the software on the universal OS.

According to an embodiment of the present invention, the software update unit is activated if the verification result is valid. The software cannot be updated unless the verification result is valid. Therefore, malicious software update processing can be prevented effectively.

According to an embodiment of the present invention, if the verification result is invalid, the software update unit is not activated, and the OS is started (restarted) in a normal mode. Unless the verification result is valid, the OS is forced to return in the normal mode, and the software update unit cannot be used. Therefore, malicious software update processing can be prevented effectively.

According to an embodiment of the present invention, each of the plurality of check files stores time data having the time of the generation or the data based on the time of the generation. Therefore, unlike the password, expiration dates can be provided to the plurality of check files. Thus, when illegal processing is performed, for example, it is possible to invalidate the verification result by using the fact that the expiration date expires because the illegal processing needs time to be performed.

According to an embodiment of the present invention, it is verified whether or not a plurality of the time data includes a time-series. If the time data includes the time-series, the verification result is valid. Therefore, unlike one password, mutual relation of the time data of the plurality of check files can be defined. Thus, in particular, when the illegal processing is performed in the middle of the generation of the plurality of check files, it is possible to invalidate the verification result by using the fact that the performance needs time to be performed.

According to an embodiment of the present invention, as for each of the plurality of time data, it is verified whether or not a difference between the time data and other closest time data is smaller than a first threshold value. If the difference is smaller than the first threshold value, the verification result is valid. Therefore, the mutual relation of the time data of the plurality of check files can be defined. Thus, in particular, when the illegal processing is performed in the middle of the generation of the plurality of check files, it is possible to invalidate the verification result by using the fact that the performance needs time to be performed.

According to an embodiment of the present invention, it is verified whether or not the difference between the present time and the data having the largest value of the plurality of time data is smaller than a second threshold value. If the difference is smaller than the second threshold value, the verification result is valid. Therefore, the mutual relation of the time data of the plurality of check files can be defined. Thus, in particular, when the illegal processing is performed during the time period from the generation of the last check file to the performance of the actual update processing of the software, it is possible to invalidate the verification result by using the fact that the performance needs time to be performed. The turn of the embodiments isn't a showing the superiority and inferiority of the invention.

Although the embodiments of the present inventions have been described in detail, it should be understood that the various changes, substitutions, and alterations could be made here to without departing from the spirit and scope of the invention.

What is claimed is:

1. A software update method comprising:
performing, by an operation on an operating system (OS) in a normal mode, generating processing which includes call processing and is executed via a plurality of processes, the OS having the normal mode and a software update mode;
restarting, by an operation on the OS in the normal mode, the OS in the software update mode for calling a verification processing when being called by the call processing; and
performing, using a processor, the verification processing for verifying the generating processing when being called by the OS in the software update mode,
wherein the generating processing further generates a plurality of check files indicating an execution status of the generating processing by the plurality of processes,
wherein the verification processing verifies the plurality of check files generated by the plurality of processes when being called by the OS in the software update mode,
wherein the generating processing of generating the check file stores time data including the time of the generation or data based on the time of the generation in each of the plurality of check files,
wherein the verification processing verifies whether or not a difference between a present time and data having a largest value of the time data stored in each of the plurality of check files is smaller than a first threshold value, and validates the verification result if the difference is smaller than the first threshold value.

2. A software update verification apparatus comprising:
a processor configured to
execute an operating system (OS) that has a normal mode and a software update mode;
perform, by an operation on the OS in the normal mode, generating processing which includes call processing and is executed via a plurality of processes;
restart, by an operation on the OS in the normal mode, the OS in the software update mode for calling a verification processing when being called by the call processing; and
perform the verification processing for verifying the generating processing when being called by the OS in the software update mode, wherein the generating processing further generates a plurality of check files indicating an execution status of the generating processing by the plurality of processes, wherein the verification processing verifies the plurality of check files generated by the plurality of processes when being called by the OS in the software update mode, wherein the generating processing of generating the check file stores time data including the time of the generation or data based on the time of the generation in each of the plurality of check files, wherein the verification processing verifies whether or not a difference between a present time and data having a largest value of the time data stored in each of the plurality of check files is smaller than a first threshold value, and validates the verification result if the difference is smaller than the first threshold value.

3. The software update verification apparatus according to claim 1,
wherein the generating processing further obtains an update file to store a program that should be updated.

4. The software update verification apparatus according to claim 3,
wherein the processor is further configured to perform a software update processing that updates the program when being activated by the OS in the software update mode,
wherein the generating processing further obtains the update file for storing the program that should be updated, and the OS in the software update mode activates the software update processing by using the update file when a verification result obtained from the verification processing is valid.

5. The software update verification apparatus according to claim 4,
wherein the OS deletes the plurality of check files generated by the plurality of processes when being activated in the normal mode after the program is updated by the software update processing.

6. The software update verification apparatus according to claim 4,
wherein the OS does not activate the software update processing when a verification result obtained from the verification processing is invalid, and the OS is activated in a normal mode.

7. The software update verification apparatus according to claim 1,
wherein the time is system time obtained from a timer of a CPU.

8. The software update verification apparatus according to claim 1,
wherein the verification processing verifies whether or not the plurality of check files exist and validates the verification result if the plurality of check files exist.

9. The software update verification apparatus according to claim 1,
wherein the verification processing verifies whether or not the plurality of check files exist, and whether or not the time data can be obtained from each of the plurality of check files, and validates the verification result if the time data can be obtained.

10. The software update verification apparatus according to claim 1,
wherein the verification processing verifies whether or not the time data stored in each of the plurality of check files includes one time-series, and validates the verification result if the time data includes the time-series.

11. The software update verification apparatus according to claim 1,
wherein the first threshold value is a value obtained based on an actual measurement of the time needed for a time period from the end of the generation of the plurality of check files to the verification.

12. The software update verification apparatus according to claim 1, wherein the verification processing verifies whether or not the difference between each data of the time data stored in the plurality of check files and the closest data to the each data among the time data stored in the plurality of check files is smaller than each of second threshold values, and validates the verification result if the difference is smaller than each of the second threshold values for all of the time data.

13. The software update verification apparatus according to claim 12, wherein each of the second threshold values is a value obtained based on an actual measurement of the time needed to generate each of the plurality of check files.

14. The software update verification apparatus according to claim 1, wherein the software update mode is a mode for rewriting the OS with restarting the OS.

15. The software update verification apparatus according to claim 1, wherein the verification processing verifies an execution status of the generating processing, and the execution status of the generation processing indicates each execution status of each the plurality of processes.

16. The software update verification apparatus according to claim 1, wherein each the plurality of check files indicates an execution status of each the plurality of processes.

* * * * *